United States Patent [19]
Berardinelli

[11] 3,962,174
[45] June 8, 1976

[54] POLYALKYLENE TEREPHTHALATE POLYMER MOLDING RESINS
[75] Inventor: Frank M. Berardinelli, Millington, N.J.
[73] Assignee: Celanese Corporation, New York, N.Y.
[22] Filed: Aug. 12, 1974
[21] Appl. No.: 496,607

[52] U.S. Cl. .............................. 260/40 R; 260/860
[51] Int. Cl.² .......................................... C08L 67/02
[58] Field of Search ........... 260/40 R, DIG. 24, 860, 260/835

[56] References Cited
UNITED STATES PATENTS
3,329,740    7/1967    Battersby ........................... 260/860

Primary Examiner—Donald E. Czaja
Assistant Examiner—S. M. Person
Attorney, Agent, or Firm—Marvin Bressler; Linn I. Grim; Thomas J. Morgan

[57] ABSTRACT

An improved thermoplastic molding resin comprising intimately blended polybutylene terephthalate polymers or polypropylene terephthalate polymers, and reinforcing agents in the presence of a thermoplastic phenoxy resin.

16 Claims, No Drawings

POLYALKYLENE TEREPHTHALATE POLYMER MOLDING RESINS

The present invention relates to the products and process for preparing improved thermoplastic molding resins. More specifically this invention describes improved reinforced polybutylene terephthalate or polypropylene terephthalate polymers including halogenated aromatic compounds incorporated in the respective polymer structure as well as improved flame retardant molding resins.

In U.S. Pat. No. 3,814,725 issued June 4, 1974, there is described improved thermoplastic polyester molding resins comprising a reinforcing filler and a polypropylene terephthalate polymer or a polybutylene terephthalate polymer. These molding resins have filled a long existing need in providing outstanding molding processing advantages combined with outstanding physical properties of the molded articles. Canadian Pat. No. 945,698 issued Apr. 16, 1974 has described outstanding flame retardant reinforced polybutylene terephthalate or polypropylene terephthalate polymers with the similar processing advantages and property advantages as those thermoplastic molding resins described in U.S. Pat. No. 3,814,725. These molding resins are outstanding products provided to the plastics industry which is always looking for an improved product. Attempts were made in Japanese Publication No. 6175/73 published Feb. 23, 1973 to improve thermoplastic polyester resin compositions by the addition of polyepoxide resins to glass reinforced polyethylene terephthalate polymers to improve their physical properties. Slight improvements of the physical properties were obtained but the known difficulties of the use of polyethylene terephthalate polymers were not overcome and the inventive concept of intimately mixed reinforcing fillers into polybutylene terephthalate or polypropylene terephthalate to provide improved thermoplastic polyester molding resins as claimed in U.S. Pat. 3,814,725 were never contemplated.

It has now been discovered that improved thermoplastic polyester resins comprising reinforced polybutylene terephthalate polymers or copolymers or polypropylene terephthalate polymers or copolymers and corresponding flame retardant compositions of these resins are provided by the incorporation of small amounts of specific high molecular weight phenoxy resins in these compositions.

The phenoxy resins utilized herein are high molecular weight thermoplastic resins which are produced from 2,2-bis (4-hydroxyphenyl) propane and epichlorhydrin according to the procedure as described in U.S. Pat. 3,356,646 issued Dec. 5, 1967. The basic chemical structure of the phenoxy resins is similar to that of epoxy resins. They are, however, a separate and unique resin class, differing from epoxies in several important characteristics:

1. Phenoxy resins are tough and ductile thermoplastics. Their average molecular weight ranges from 15,000 to 75,000 preferably from 20,000 to 50,000 compared with 340 to 13,000 for conventional epoxies which crosslink on polymerization.
2. Phenoxy resins do not have terminal highly reactive epoxy groups and are thermally stable materials with a long shelf life.
3. The phenoxy resins can be used without further chemical conversion. They require no catalysts, curing agents or hardeners to be useful products while epoxy resins require catalysts, curing agents or hardeners to be useful. The phenoxy resins utilized herein can be characterized by a repeating structure:

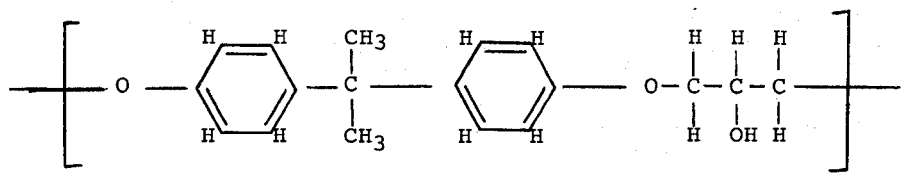

and having an average molecular weight range from about 15,000 to 75,000. As is obvious, the terminal structure is completed with hydrogen atoms or some suitable end capping groups.

The thermoplastic phenoxy resin can be added to the reinforced polyester resin in a number of ways (1) by incorporating the phenoxy resin onto the reinforcing agent prior to its intimate blending with the polyalkylene terephthalate, (2) by simultaneously intimately mixing with the reinforcing agent and the polyalkylene terephthalate and (3) by blending with the polymer and then intimately blending with the reinforcing agent. Other mixing techniques can be used.

The amount of phenoxy resin incorporated can range from about 0.1 to about 8 weight percent preferably from about 0.5 to about 3 weight percent of the total thermoplastic polyester molding resin.

The base of the molding resins of this invention is a polyalkylene terephthalate polymer selected from the group consisting of polypropylene terephthalate and polybutylene terephthalate. These polymers can be produced from the reaction product of terephthalic acid or a dialkyl ester of terephthalic acid (especially dimethyl terephthalate) and glycols having 3 and 4 carbon atoms. Suitable glycols include trimethylene glycol, tetramethylene glycol, 1,3-butylene glycol, 1,2-propylene glycol, 1,2-butylene glycol, 2,3-butylene glycol and the like. The polymers as used have an intrinsic viscosity in the range of from about 0.2 to about 1.2 deciliters per gram and a preferred intrinsic viscosity range from about 0.5 to about 1.0 deciliters per gram. The intrinsic viscosity is measured in a standard way utilizing an 8 weight percent polymer solution in orthochlorophenol at 25°C.

Included in the definition of polybutylene terephthalate polymers or polypropylene terephthalate polymers are those polymers containing a halogenated aromatic compound preferably brominated, incorporated in the polymer structure as co or terpolymers. Halogenated aromatic compounds containing polyfunctional hydroxyl or acid units which can be copolymerized with the polyalkylene terephthalates are suitable. A highly desirable compound for this purpose is 2,2-bis(4- ethoxy-dibromo phenyl) propane. These terpolymers can be used as a basis for flame retardant reinforced molding resins in the presence of a catalytic amount of a metal containing compound wherein the metal is selected from the group consisting of arsenic, antimony, bismuth and phosphorous. Preferably antimony trioxide.

The flame retardant molding resins of this invention can be produced by utilizing compositions as described in Canadian Pat. No. 945,698 issued Apr. 16, 1974. This is carried out by intimately mixing the polyalkylene terephthalate polymers with the combination of an aromatic halide and a group Vb metal containing compound. In its preferred embodiment the aromatic halide is present from about 3.3 to about 16 percent, based on the weight of the resin, calculated as halide, and the group Vb metal containing compound is present from about 0.7 to about 10.0 weight percent, based on the weight of the resin, calculated as the group Vb metal; in addition, the weight ratio of available halogen in the aromatic halide to available group Vb metal in the group Vb metal containing compound is in the range of from greater than about 0.3 to less than about 4. The most preferred embodiments confine this latter range to from about 0.46 to about 2.0.

It is known that aromatic halides when used in conjunction with a Group Vb (as taken from the Periodic Table of the Elements found in *Advanced Inorganic Chemistry* by Cotton and Wilkerson, Interscience Publishers, 1962) metal containing compound, effectively reduced the burning properties of reinforced polypropylene terephthalate and polybutylene terephthalate.

The specific aromatic halides found appropriate therein were selected from the following groups:

(I)

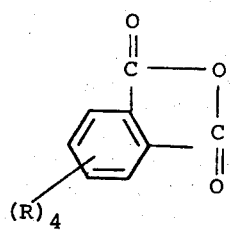

wherein R represents: hydrogen, chlorine, bromine, with at least one, preferably at least two chlorines or at least two bromines. For example, tetrabromophthalic anhydride and tetrachlorophthalic anhydride, and the like. Or, (II)

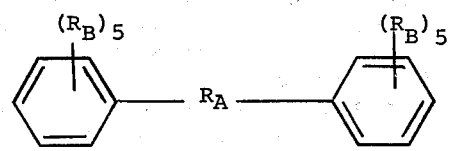

wherein $R_A$ represents: oxygen, sulfur, sulfur dioxide, methylene, phosphonates; wherein each $R_B$ represents: hydrogen, chlorine, bromine, with at least one, preferably at least two chlorines or at least two bromines.

For example 3,5,3',5'-tetrabromobiphenyl ether or 3,5, 3',5'-tetrabromobiphenyl ether or 3,5,3',5'-tetrachlorobiphenyl sulfide or 3,5-dichloro-3',5'-dibromo biphenylsulfoxide or 2,4-dichloro-3',4',5'-tribromobiphenylmethane or decarbromodiphenyl ether and the like.

(III)

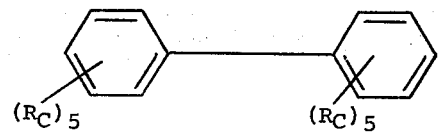

wherein each $R_C$ represents: hydrogen, chlorine, bromine with at least one, preferably at least two chlorines or at least two bromines.

For example, 2,2',4,4',6,6' hexachlorobiphenyl or 2,2', 4,4',6,6' hexabromobiphenyl, and the like.

(IV)

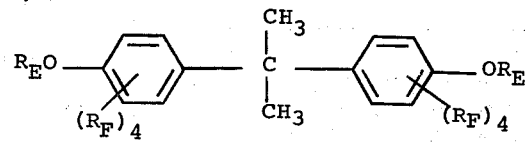

wherein each $R_E$ represents: hydrogen, acetate, methyl wherein each $R_F$ represents: hydrogen, chlorine, bromine, with at least one, preferably at least two chlorines or at least two bromines.

For example, 2,2-bis(3,5-dibromo 4-hydroxyphenyl) propane, 2,2-bis(3,5-dichloro 4-acetoxyphenyl) propane, 2,2-bis (3,5-dichloro 4-methoxyphenyl) propane and the like.

Group Vb compounds found suitable therein were compounds containing phosphorus, arsenic, antimony or bismuth. Most particularly, the compounds selected from the oxides of these Group Vb metals, with the preferred embodiment being antimony trioxide.

The aromatic halide and Group Vb metal containing compound may be incorporated in the molding resins of the present invention in any standard manner. It is preferred, however, that they be added during the polymerization reaction and, prior to the introduction of the reinforcing agent.

The reinforcing agents as utilized herein which provide increased strength to the molded product can be intimately mixed by either dry blending or melt blending, blended in extruders, heated rolls or other types of mixers. If desired, the reinforcing agents can be blended with the monomers in the polymerization reaction as long as the polymerization reaction is not affected. The type of fillers which can be used include among others, glass fibers (chopped or continuous rovings), asbestos fibers, cellulosic fibers, synthetic fibers, including graphite fibers, acicular calcium metasilicate and the like. The amount of reinforcing agent can range from about 2 to about 60 weight percent, preferably 5 to 60 weight percent based on the total molding composition.

The following examples will serve to illustrate the invention without limiting the same.

EXAMPLES

Polybutylene terephthalate having an intrinsic viscosity of 0.75 deciliters per gram was tumble blended with glass fibers (1/8 inch length) and then extrusion blended by force feeding through a one inch single screw extruder with a strand die. The temperatures of the extruder and die were set at 500°, 510°, 510° and 500°F. (from the barrel to die). The strands were ground in a milling type mixer to pass through a large screen (4 mesh or smaller). In the use of additives, phenoxy resin, free of epoxide groups, prepared from 2,2-bis(4-hydroxyphenyl) propane and epichlorhydrin having a number average molecular weight in the range from 27,000 to 29,000 can be added in the tumble blender or in the extrusion blender. The diepoxide of the reaction product of 2,2-bis(4-hydroxyphenyl) propane and epichlorhydrin having a number average molecular weight in the range from 8,000 to 12,000 can also be added in the identical places as the phenoxy resin. Reference to the diepoxide is hereinafter described as epoxy.

The various materials prepared were molded into tensile test bars under the following conditions.

| Processing Temperature | 490°F. |
|---|---|
| Mold Temperature | 150°F. |
| Screw Speed | 75 rpm |
| Total Cycle Time | 23 seconds |

The results in Table I utilize 30 weight percent glass fibers (1/8 inch length) intimately mixed with polybutylene terephthalate in the presence of various amounts of additives such as phenoxy resin and epoxy.

TABLE 1

Comparative Properties of 30% Glass Reinforced Polybutylene Terephthalate with Phenoxy Resin and Epoxy Additives

| Amount of Additive (Weight Percent of Composition) | none | 1% | | 1.5% | | 2% | |
|---|---|---|---|---|---|---|---|
| Type of Additive | none | Phenoxy | Epoxy | Phenoxy | Epoxy | Phenoxy | Epoxy |
| Tensile Strength psi | 17,740 | 19,274 | 18,650 | 19,220 | 18,631 | 19,530 | 18,852 |
| Elongation, % | 2.6 | 3.0 | 3.5 | 3.4 | 2.3 | 2.8 | 2.6 |
| Energy to Break, in.-lbs. | 86 | 92.7 | 97.7 | 94.3 | 87.3 | 101.3 | 95 |
| Flexural Strength, psi | 27,984 | 29,691 | 29,110 | 29,486 | 29,175 | 30,357 | 28,961 |
| Flexural Modulus, psi × 10⁶ | 1.11 | 1.24 | 1.16 | 1.21 | 1.17 | 1.23 | 1.13 |
| Notched Izod, ft-lb/in. notch | 1.5 | 1.6 | 1.6 | 1.6 | 1.5 | 1.6 | 1.5 |
| Reversed Notched Izod ft/lb/in | 9.4 | 10.5 | 10.2 | 10.6 | 10.6 | 10.4 | 10.1 |
| ½ Pound Gardner impact, in-lb | 5.0 | 7.5 | 6.25 | 5.75 | 5.0 | 5.6 | 4.375 |

The comparative results of Table I indicate that the presence of phenoxy resin and epoxy resin provide improved physical properties over the control containing no additives. The presence of phenoxy resin, however, provides significant improvements over the epoxy resin in tensile strength, flexural strength, and impact, among other properties. This is indeed surprising considering that the phenoxy resin does not appear to have reactive groups such as the epoxy resins do. It is further surprising that the phenoxy resin additive, known as an adhesive, is compatible with the reinforced polybutylene terephthalate molding resin and provides outstandingly smooth surface effects free of defects.

Significant improvements of phenoxy resin additives are also demonstrated over the control on heat aging of the samples in Table II at 195°C. Furthermore, the improvements of the polymers of this invention are maintained over the epoxy containing samples on heat aging. These results are demonstrated in Table II.

TABLE II

Heat Aging of 30% Glass Reinforced Polybutylene Terephthalate

| Tensile Strength psi Hours of Aging at 195°C. | Control 0 | Phenoxy 1% | Phenoxy 1½% | Phenoxy 2% | Epoxy 1% | Epoxy 1½% | Epoxy 2% |
|---|---|---|---|---|---|---|---|
| 0 | 17,740 | 19,270 | 19,220 | 19,530 | 18,650 | 18,630 | 18,850 |
| 144 | 18,920 | 21,800 | 22,230 | 22,220 | 21,330 | 21,030 | 21,180 |
| 289 | 13,710 | 21,980 | 21,750 | 21,150 | 20,920 | 21,030 | 20,380 |
| 433 | 11,210 | 19,830 | 19,490 | 19,080 | 19,740 | 19,050 | 18,600 |
| 529 | 10,770 | 18,040 | 18,010 | 17,760 | 17,440 | 17,260 | 17,010 |
| 771 | 9,000 | 15,510 | 16,060 | 15,970 | 15,220 | 15,660 | 15,570 |
| IMPACT | | | | | | | |
| Notched Izod ft/lbs/in notch | 1.5 | 1.6 | 1.6 | 1.6 | 1.6 | 1.5 | 1.5 |
| Reverse Notched Izod in.-lbs. | 9.4 | 10.5 | 10.6 | 10.1 | 10.2 | 10.6 | 10.1 |
| ½ lb. Gardner in.-lb. | 5.0 | 7.5 | 5.75 | 5.63 | 6.25 | 5.0 | 4.38 |
| FLEX PROPERTIES | | | | | | | |
| Strength psi | 27,980 | 29,960 | 29,490 | 30,360 | 29,110 | 29,180 | 28,960 |
| Modulus (10⁶ psi) | 1.11 | 1.24 | 1.21 | 1.23 | 1.16 | 1.17 | 1.13 |

In utilizing polypropylene terephthalate polymer in the same manner as polybutylene terephthalate above, similar results are obtained utilizing up to 8 weight percent phenoxy resin.

ADDITIONAL EXAMPLES

The following Table III demonstrates the physical properties of 1/16 inch thick sample bars molded of various weight percent glass reinforced polybutylene terephthalate containing 7 weight percent decabromodiphenyl ether and 7 weight percent antimony trioxide.

TABLE III

| Property | PBT plus - | | |
|---|---|---|---|
| | 30% glass | 40% glass | 35% glass |
| Tensile Strength at break (psi) | 17,100 | 18,500 | 18,100 |
| Work energy to break (in lbs.) | 80 | 63 | 78 |
| Percent elongation at break | 1.5 | 1.5 | 1.4 |
| Flexural strength, psi | 25,300 | 28,500 | 26,900 |
| Flexural modulus ($10^6$ psi) | $1.12 \times 10^6$ | $1.71 \times 10^6$ | $1.52 \times 10^6$ |
| Izod Impact, ft.-lbs/in. notch | 1.29 | 1.42 | 1.40 |
| Deflection temp. 264 psi, °C. | 201 | 204 | 198 |

The addition of 1 to 2 percent phenoxy resin will increase the physical properties of the above flame retardant molding resin by approximately 8 percent compared to only about 5 percent increase with the epoxy addition. The flame retardant compositions containing phenoxy resins do not have the heat stability advantages which the non-flame retardant compositions possess as described in Table I.

For example the utilization of 3 percent phenoxy resin in the 30 percent glass fiber flame retardant composition of Table III provided the following result.

| | |
|---|---|
| Tensile Strength psi | 20,740 |
| Elongation % | 1.8 |
| Energy to break in-lbs. | 76.8 |
| Flexural Strength psi | 29,650 |
| Flexural Modulus $10^6$ psi | 1.42 |
| Notched Izod ft-lb/in. notch | 1.20 |
| Reverse Notched Izod ft-lbs/in. | 8.68 |
| ½ lb. Gardner Impact, in-lb. | 3.83 |

The improvements as stated above are also obtained in terpolymers of halogenated aromatic compounds such as 2,2-bis(4-ethoxy dibromophenyl) propane (15 weight percent of the polymer) and polybutylene terephthalate in the presence of 3 weight percent antimony trioxide of the polymer.

ADDITIONAL EXAMPLES

Phenoxy resin as utilized in the previous Example was added to polybutylene terephthalate and acicular calcium metasilicate as illustrated in Table IV.

TABLE IV

| Acicular Calcium Metasilicate Physical Properties In Polybutylene Terephthalate I.V. = 0.75 | | | | |
|---|---|---|---|---|
| Phenoxy | 0 | .25 | .50 | .75 |
| Weight, % | 57.58 | 55.11 | 57.12 | 56.78 |
| Volume, % | 38.19 | 35.85 | 37.74 | 37.42 |
| Tensile Strength, psi | 7735 | 8330 | 8240 | 8329 |
| Elongation to Break, % | 0.70 | 1.10 | 1.00 | 1.00 |
| Energy to Break, in-lbs. | 28.28 | 35.92 | 31.63 | 33.90 |
| Flexural Strength, psi | 13,810 | 15,140 | 15,100 | 15,200 |
| Flexural Modulus, $10^6$ psi | 1.55 | 1.41 | 1.49 | 1.47 |
| Notched Izod, in-lb. | 0.693 | 0.585 | 0.720 | 0.585 |
| Reverse Notched Izod, in-lb. | 2.850 | 3.122 | 2.977 | 3.110 |
| ½ lb. Gardner Impact, in-lb. | 1.75 | 2.0 | 1.75 | 1.75 |

What is claimed is:

1. An improved thermoplastic polyester molding resin comprising a polyalkylene terephthalate polymer selected from the group consisting of polybutylene terephthalate polymer and polypropylene terephthalate polymer, and having an intrinsic viscosity in the range of from 0.2 to about 1.2 deciliters per gram, reinforcing agents intimately mixed with said polymer and from about 0.1 to about 8 weight percent, based on the total thermoplastic polyester molding resin, of a thermoplastic phenoxy resin having a repeating structure

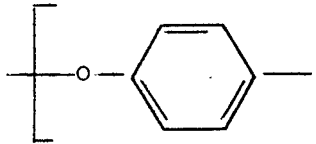 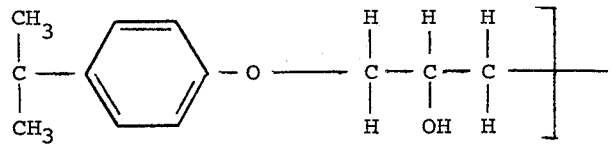

and an average molecular weight range from about 15,000 to about 75,000.

2. The product of claim 1 wherein the amount of reinforcing agent ranges from about 5 to about 60 weight percent of the total thermoplastic molding resin.

3. The product of claim 2 wherein the reinforcing agents are glass fibers.

4. The product of claim 2 wherein the reinforcing agent is acicular calcium metasilicate.

5. The product of claim 3 wherein the polyalkylene terephthalate polymer is polybutylene terephthalate having an intrinsic viscosity in the range from about 0.5 to about 1.0 deciliters per gram.

6. The product of claim 2 wherein the amount of phenoxy resin ranges from about 0.5 to 3 weight percent of the total thermoplastic polyester molding resin and said phenoxy resin having an average molecular weight ranging from about 20,000 to about 50,000.

7. The product of claim 2 wherein the polyalkylene terephthalate polymer is a polybutylene terephthalate containing brominated aromatic compounds incorporated in the polymer in the presence of a metal containing compound wherein the metal selected from the group consisting of arsenic, antimony, bismuth and phosphorus.

8. The product of claim 2 wherein the polyalkylene terephthalate contains 2,2-bis(4-ethoxy, 3,5- dibromophenyl) propane incorporated in the structure and in the presence of antimony trioxide.

9. The product of claim 2 wherein the polyalkylene terephthalate is polybutylene terephthalate containing 2,2-bis(4-ethoxy, 3,5-dibromophenyl) propane incorporated in the structure and in the presence of antimony trioxide and glass fibers.

10. The product of claim 2 intimately mixed with flame retardant additives comprising an aromatic halide stable at temperatures necessary for melt processing of the polyalkylene terephthalate and capable of decomposing at combustion temperatures of the polyalkylene terephthalate and a metal containing compound, said metal selected from the group consisting of arsenic, antimony, bismuth and phosphorus, wherein the weight ratio of available halogen in the aromatic halide to the available metal in the metalcontaining compound ranges from about 0.3 to about 4.

11. A process for producing an improved thermoplastic polyester molding resin wherein a polyalkylene terephthalate polymer selected from the group of polybutylene terephthalate polymer and polypropylene terephthalate polymer and having an intrinsic viscosity in the range from about 0.2 to 1.2 is intimately mixed with about 5 to about 60 weight percent of the total molding resin of a reinforcing agent in the presence of about 0.1 to about 8 weight percent of the total molding resin of a thermoplastic phenoxy resin having a repeating structure:

terephthalate is a polybutylene terephthalate containing a brominated aromatic compound incorporated in the polymer structure and also containing a metal containing compound wherein the metal is selected from the group consisting of arsenic, antimony and bismuth.

14. The process of claim 12 wherein flame retardant additives are intimately mixed in the molding resin, said additives comprising an aromatic halide stable at temperatures necessary for melt processing of the polyalkylene terephthalate and capable of decomposing at combustion temperatures of the polyalkylene terephthalate and a metal containing compound, said metal selected from the group consisting of arsenic, antimony, bismuth and phosphorus wherein the weight ratio of available halogen in the aromatic halide to the available metal in the metal containing compound ranges from about 0.3 to about 4.

15. The process of claim 11 wherein the thermoplastic phenoxy resin is incorporated on the reinforcing agent and then intimately blended with the polyalkylene terephthalate polymer.

16. The product of claim 2 intimately mixed with flame retardant additives comprising an aromatic halide present in a concentration of from about 3.3 to about 16 weight percent, based on the weight of the resin, calculated as halide, said aromatic halide compound stable at temperatures necessary for melt processing of the polyalkylene terephthalate and capable of decomposing at combustion temperatures of the

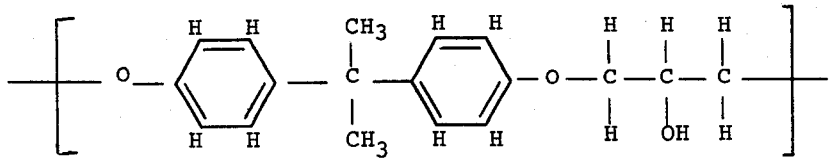

and an average molecular weight range from about 15,000 to about 75,000.

12. The process of claim 11 wherein the reinforcing agent is glass fibers.

13. The process of claim 12 wherein the polyalkylene polyalkylene terephthalate, and a metal containing compound, said metal selected from the group consisting of arsenic, antimony, bismuth and phosphorous, present in a concentration of from about 0.7 to about 10.0 weight percent, based on the weight of the resin.

* * * * *